(12) United States Patent
Shindoh et al.

(10) Patent No.: US 7,792,695 B2
(45) Date of Patent: Sep. 7, 2010

(54) APPARATUS, PROGRAM, AND METHOD FOR DISPLAYING BENEFIT VALUES OF A PRODUCT

(75) Inventors: Minoru Shindoh, Tokyo (JP); Kazutaka Yamasaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 11/780,675

(22) Filed: Jul. 20, 2007

(65) Prior Publication Data

US 2008/0033789 A1    Feb. 7, 2008

(30) Foreign Application Priority Data

Aug. 4, 2006    (JP)    ............... 2006-213601

(51) Int. Cl.
*G06F 17/00*    (2006.01)
(52) U.S. Cl. ..................................... 705/10
(58) Field of Classification Search ............ 705/10
See application file for complete search history.

(56) References Cited

U.S. PATENT DOCUMENTS 6,965,867 B1 *  11/2005  Jameson ................ 705/8
7,376,578 B1 *  5/2008  Kalyan .................. 705/8
2004/0073573 A1 *  4/2004  Hopkins ............. 707/104.1
2006/0218062 A1 *  9/2006  Drew et al. ............. 705/35

FOREIGN PATENT DOCUMENTS

JP    2001-206832    7/2001
JP    2004-086515    3/2003

OTHER PUBLICATIONS

McKinsey Pricing; Yamashina et al., Diamond Inc. (Japanese Publishing Company); Setting value, not price; The McKinsey Quarterly 1997, No. 1 (English Translation); pp. 98-115.

* cited by examiner

*Primary Examiner*—Thomas Dixon
(74) *Attorney, Agent, or Firm*—Schmeiser, Olsen & Watts; William H. Steinberg

(57) ABSTRACT

A system provides a way for understanding the benefits of a plurality of products based on a viewpoint from a customer that prefers a specific product. The system includes a selection unit for receiving a selection of a specific commodity among a plurality of commodities, a generation unit for generating a benefit model in which a benefit value of a specific commodity becomes the maximum, a calculation unit for calculating benefit values of the commodities using the benefit model, and a display unit for displaying the benefit values of the commodities.

13 Claims, 11 Drawing Sheets

FIG. 5

| | EXISTENCE OF HIGH-CLASS TABLEWARE USAGE | NUMBER OF FOOD VARIETIES | NUMBER OF VEGETABLE TYPES | NUMBER OF TOPPING VARIETIES | AMOUNT OF BREAD (GRAM) | AMOUNT OF FOOD (GRAM) | ENERGY (CALORIE) | AMOUNT OF LIPID (GRAM) |
|---|---|---|---|---|---|---|---|---|
| W RESTAURANT MENU A | 0 | 4 | 5 | 1 | 200 | 100 | 600 | 20 |
| W RESTAURANT MENU B | 0 | 5 | 4 | 1 | 180 | 130 | 700 | 15 |
| W RESTAURANT MENU C | 0 | 4 | 3 | 0 | 200 | 120 | 700 | 30 |
| X RESTAURANT MENU D | 0 | 3 | 4 | 0 | 180 | 150 | 700 | 35 |
| X RESTAURANT MENU E | 0 | 4 | 3 | 0 | 200 | 130 | 750 | 25 |
| X RESTAURANT MENU F | 0 | 3 | 2 | 0 | 180 | 130 | 650 | 45 |
| Y RESTAURANT MENU G | 1 | 4 | 4 | 1 | 220 | 120 | 800 | 25 |
| Y RESTAURANT MENU H | 0 | 4 | 2 | 0 | 200 | 120 | 650 | 50 |
| Y RESTAURANT MENU I | 0 | 5 | 4 | 0 | 190 | 110 | 600 | 35 |
| Z RESTAURANT MENU J | 0 | 5 | 6 | 2 | 200 | 120 | 600 | 10 |
| Z RESTAURANT MENU K | 1 | 4 | 5 | 0 | 220 | 150 | 800 | 20 |
| Z RESTAURANT MENU L | 0 | 4 | 4 | 0 | 200 | 130 | 750 | 40 |

| | SELLING PRICE |
|---|---|
| W RESTAURANT MENU A | 450 |
| W RESTAURANT MENU B | 500 |
| W RESTAURANT MENU C | 500 |
| X RESTAURANT MENU D | 480 |
| X RESTAURANT MENU E | 480 |
| X RESTAURANT MENU F | 450 |
| Y RESTAURANT MENU G | 500 |
| Y RESTAURANT MENU H | 400 |
| Y RESTAURANT MENU I | 500 |
| Z RESTAURANT MENU J | 550 |
| Z RESTAURANT MENU K | 550 |
| Z RESTAURANT MENU L | 500 |

| | EXISTENCE OF HIGH-CLASS TABLEWARE USAGE | NUMBER OF FOOD VARIETIES | NUMBER OF VEGETABLE TYPES | NUMBER OF TOPPING VARIETIES | AMOUNT OF BREAD (GRAM) | AMOUNT OF FOOD (GRAM) | ENERGY (CALORIE) | AMOUNT OF LIPID (GRAM) | INTERCEPT |
|---|---|---|---|---|---|---|---|---|---|
| Z RESTAURANT MENU J | -0.14 | -0.08 | -0.24 | 0.06 | 0.02 | 0.03 | -0.01 | 0.02 | -2.79 |
| Y RESTAURANT MENU H | 0.48 | -0.21 | -0.30 | 0.63 | 0.01 | 0.00 | 0.00 | 0.01 | 1.01 |

|  | BENEFIT VALUE | BENEFIT VALUE (PRICE EQUIVALENT) |
|---|---|---|
| W RESTAURANT MENU A | 0.12 | 468 |
| W RESTAURANT MENU B | 0.12 | 468 |
| W RESTAURANT MENU C | 0.09 | 464 |
| X RESTAURANT MENU D | 0.64 | 518 |
| X RESTAURANT MENU E | 0.00 | 456 |
| X RESTAURANT MENU F | 0.93 | 547 |
| Y RESTAURANT MENU G | 0.00 | 456 |
| Y RESTAURANT MENU H | 1.00 | 554 |
| Y RESTAURANT MENU I | 0.01 | 457 |
| Z RESTAURANT MENU J | 1.00 | 554 |
| Z RESTAURANT MENU K | 0.06 | 462 |
| Z RESTAURANT MENU L | 0.01 | 457 |

FIG. 9

| | BENEFIT VALUE | BENEFIT VALUE (PRICE EQUIVALENT) |
|---|---|---|
| W RESTAURANT MENU A | 0.45 | 497 |
| W RESTAURANT MENU B | 0.00 | 451 |
| W RESTAURANT MENU C | 0.30 | 482 |
| X RESTAURANT MENU D | 0.07 | 458 |
| X RESTAURANT MENU E | 0.11 | 462 |
| X RESTAURANT MENU F | 0.91 | 545 |
| Y RESTAURANT MENU G | 1.00 | 554 |
| Y RESTAURANT MENU H | 1.00 | 554 |
| Y RESTAURANT MENU I | 0.00 | 451 |
| Z RESTAURANT MENU J | 0.47 | 499 |
| Z RESTAURANT MENU K | 0.05 | 456 |
| Z RESTAURANT MENU L | 0.00 | 451 |

US 7,792,695 B2

APPARATUS, PROGRAM, AND METHOD FOR DISPLAYING BENEFIT VALUES OF A PRODUCT

CROSS-REFERENCE TO RELATED APPLICATIONS

This application claims priority from Japanese Patent Application Serial No. 2006-213601 filed on Aug. 4, 2006.

FIELD OF THE INVENTION

This invention relates generally to the field of generally to an information processing technology, and more particularly to an apparatus, a program, and a method for displaying benefit values of a product, including commodities, merchandise, and services.

BACKGROUND OF THE INVENTION

When a company sets selling prices of a product, it is important to take into consideration a balance between selling prices and benefits that a customer thinks he/she can obtain from the product (hereinafter, referred simply to as "benefit (s)"). Namely, when a retail price is higher as compared with a benefit, the customer does not buy the product. On the contrary, if the retail price is too low as compared with the benefit, a profit obtained from one product will become small. Hence, techniques for appropriately setting the price by estimating the benefit have been studied.

As one of the techniques for supporting the price setting of the product, there is a technique using a value map in which indexes of benefits (hereinafter, referred to as "benefit value (s)") and a selling price for a plurality of product are plotted as two axes on a plane (Japanese Unexamined Patent Publication (Kokai) No. 2004-86515). A company can use the value map in which the selling prices and the benefit values of the company's product and competitor's product are plotted with two axes, as information useful for estimating appropriate selling prices of the company's product in the current market.

Japanese Unexamined Patent Publication (Kokai) No. 2004-86515 discloses a price setting system for calculating product prices based on information including material costs or the like regarding a product specified by a person who wishes to purchase. According to Japanese Unexamined Patent Publication (Kokai) No. 2004-86515, it is possible to appropriately set prices, since the possibility that information on the material costs changes according to a total usage amount of materials which are common to a plurality of types of product, the possibility that prices are set based on information on volume of sales of the newest product, and the possibility that the material costs corresponding to the total usage amount of the materials which are common to the plurality of types of the product, are taken into consideration.

Japanese Unexamined Patent Publication (Kokai) No. 2001-306832 discloses an online sales system for musical pieces, in which a sales server sets selling prices for musical pieces according to a popularity ranking of musical pieces determined by a ranking server based on information on previews, downloads, or popularity votes of musical pieces which are performed by users of terminal units, and publishes the selling prices and the popularity rankings of the musical pieces on homepages.

For example, when a company sets selling prices of a product, there is a case where it may become important to understand the benefits of the product. However, since what aspects of the product have importance in purchasing the product are different from customer to customer, levels of the benefits of the product may possibly change depending on respective customer's viewpoints. However, the prior art or combination thereof does not take this into account.

SUMMARY OF THE INVENTION

Briefly stated, a system provides a way for understanding the benefits of a plurality of products based on a viewpoint from a customer that prefers a specific product. The system includes a selection unit for receiving a selection of a specific commodity among a plurality of commodities, a generation unit for generating a benefit model in which a benefit value of a specific commodity becomes the maximum, a calculation unit for calculating benefit values of the commodities using the benefit model, and a display unit for displaying the benefit values of the commodities.

According to an embodiment of the invention, an apparatus for displaying benefit values of a plurality of products includes a selection unit for receiving a selection of a specific product among the plurality of products; a generation unit for generating a benefit model in which a benefit value of the specific product becomes the maximum; a calculation unit for calculating benefit values of the plurality of products using the benefit model; and a display unit for displaying the benefit values of the product.

According to an embodiment of the invention, a program product, where the program product causes a computer system provided with a CPU, a memory, an input device, and a display unit to execute a series of steps for displaying benefit values of a plurality of products, where the steps are: (a) receiving a selection of a specific product among the plurality of products from the input device and storing it in the memory; (b) generating, by the CPU, a benefit model in which a benefit value of the specific product stored in the memory becomes a maximum value and storing it in the memory; (c) calculating, by the CPU, benefit values of the plurality of products, by using the benefit model stored in the memory, and storing the benefit values in the memory; and (d) formatting a display, by the CPU, wherein a visual graph in which the benefit values of the products stored in the memory are plotted on the display unit.

According to an embodiment of the invention, a method for displaying benefit values of a plurality of products in a computer system provided with a CPU, a memory, an input device, and a display unit includes the steps of: (a) receiving a selection of a specific product among the plurality of products from the input device and storing it in the memory; (b) generating, by the CPU, a benefit model in which a benefit value of the specific product stored in the memory becomes a maximum value and storing it in the memory; (c) calculating, by the CPU, benefit values of the plurality of products, by using the benefit model stored in the memory, and storing the benefit models in the memory; and (d) displaying the benefit values of the product stored in the memory on the display unit.

The present invention provides a way for understanding the benefits of a plurality of products based on a viewpoint from a customer that prefers a specific product. If the benefit values of a plurality of products are automatically calculated based on the viewpoint from the customer that prefers the specific product and a relationship between selling prices and calculated benefits can also be understood, it will be convenient upon setting the selling prices of the product.

An apparatus for displaying benefit values of a plurality of product is provided with a selection unit for receiving a selection of a specific product among the plurality of product, a generation unit for generating a benefit model in which a benefit value of the specific product becomes the maximum, a calculation unit for calculating benefit values of the plurality of product using the benefit model, and a display unit for displaying the benefit values of the product.

While a summary of the present invention has been described as the apparatus for displaying the benefit values of the plurality of product, the present invention can also be understood as a method, a program, or a program product for displaying the benefit values of the plurality of product. The program product can include, for example, a storage medium for storing the above-mentioned program, or a medium for transmitting the program.

BRIEF DESCRIPTION OF THE DRAWINGS

FIG. 5 shows an example of the contents of the attribute value storage unit in an embodiment of the present invention.

FIG. 6 shows an example of the price storage unit in the embodiment of an embodiment of the present invention.

FIG. 7 shows an example of the parameter values of the benefit model in an embodiment of the present invention.

FIG. 8 shows an example of the calculation result of the benefit values in an embodiment of the present invention.

FIG. 9 shows an example of the calculation result of the benefit values in an embodiment of the present invention.

DETAILED DESCRIPTION OF THE PREFERRED EMBODIMENT

While a method and a system are mainly described in the following embodiments, the present invention can also be carried out as a program or a program product available in the computer as apparent to those skilled in the art. Hence, the present invention can include an embodiment as hardware, an embodiment as software, or an embodiment of a combination of the software and the hardware. The program can be recorded on any arbitrary computer readable media, such as a hard disk, a CD-ROM, an optical storage unit, a magnetic storage unit, or the like.

Figure 1:
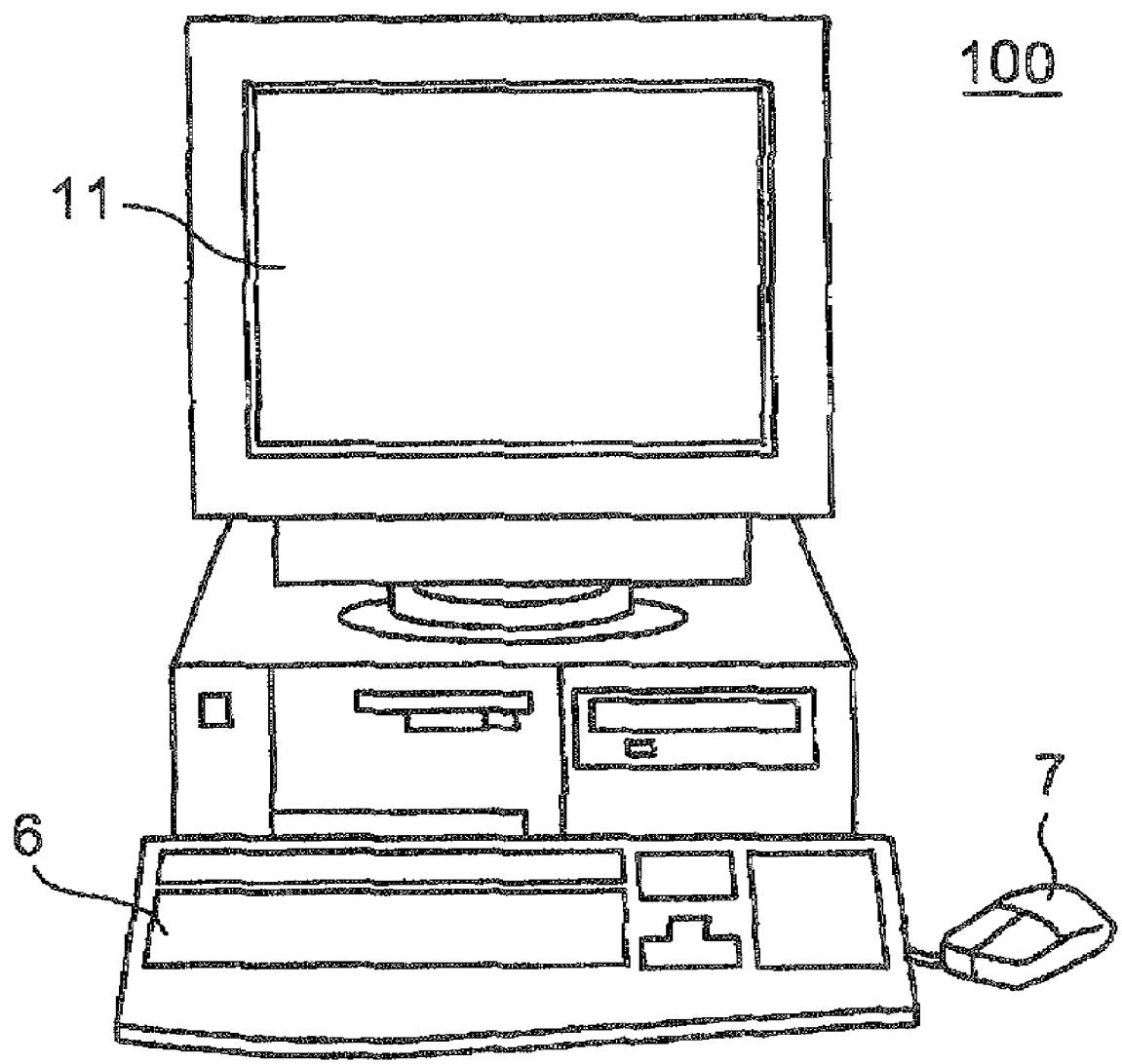
FIG. 1 shows an example of an external view of a computer system for supporting a price setting according to an embodiment of the present invention.

FIG. 1 illustrates an example of an external view of a computer system 100 for supporting setting prices according to an embodiment of the present invention. A computer system 100 includes a keyboard 6, a mouse 7, and a display unit 11.

The display unit 11 of the computer system 100 visually presents information on a work condition or the like for a user. The user can operate a plurality of windows displayed on the display unit 11 by a multi-window operating system, and utilize any desired computer software application among one or more computer software applications, by using an input device, such as the keyboard 6, the mouse 7, or the like. In order to efficiently use the applications, the user can carry out the operation of the displayed window.

Figure 2:
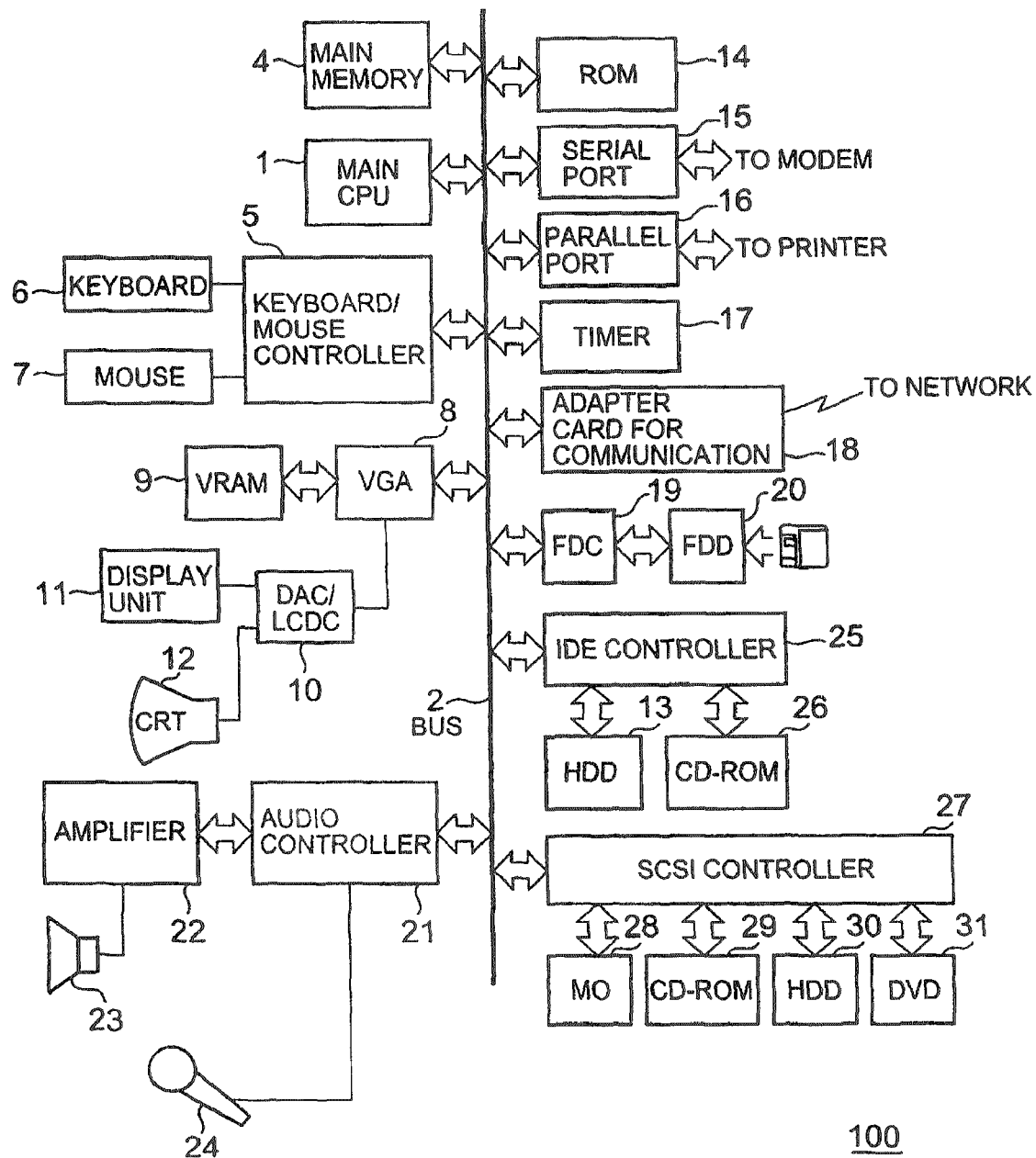
FIG. 2 shows a diagram for exemplifying a hardware configuration of an information processing apparatus suitable for achieving the computer system in an embodiment of the present invention.

FIG. 2 shows a diagram for exemplifying a hardware configuration of an information processing apparatus suitable for achieving the computer system 100 in an embodiment of the present invention. The information processing apparatus includes a central processing unit (CPU) 1 and a main memory 4. The CPU 1 and the main memory 4 are preferably connected to a hard disk device 13 as an auxiliary memory through a bus 2. Further, removable storages (external storage systems in which recording media can be exchanged), such as a flexible disk device 20, an MO (magneto-optical) device 28, and CD-ROM devices 26 and 29 are connected to the bus 2 through related flexible disk controller 19, IDE controller 25, SCSI controller 27, and the like.

Storage media, such as a flexible disk, an MO, and a CD-ROM, are inserted in the removable storages, such as the flexible disk device 20, the MO device 28, and the CR-ROM devices 26 and 29, respectively, and it is possible to record code of a computer program for giving instructions to the CPU or the like on this flexible disk, the hard disk device 13, a ROM 14, and the like while working with an operating system to carry out the present invention. The computer program is executed by being loaded to the main memory 4. The computer program can be compressed, or also be divided into a plurality of pieces to be recorded in a plurality of media.

The information processing apparatus can further have a pointing device 7 such as the mouse or the like, the keyboard 6, and a display 12 for presenting visual data to the user, as user interface hardware. Additionally, it is possible to connect it to a printer (not shown) through a parallel port 16, or to connect it to a modem (not shown) through a serial port 15. A server 300 is connected to a network through the serial port 15 and the modem, or through a communication adapter 18 (an Ethernet (R) card and a Token Ring card) or the like, and can communicate to other computers or the like.

The loudspeaker 23 receives an audio signal subjected to D/A conversion (digital/analog conversion) by an audio controller 21 through an amplifier 22, and outputs it as audio. Further, the audio controller 21 performs A/D conversion (analog/digital conversion) of speech information received from a microphone 24, thus making it possible to take speech information outside the system into the system.

It will be readily understood from the explanation described above that the information processing apparatus in the embodiment of the present invention is achieved by an information processing apparatus, such as a mainframe, a workstation, or a general-purpose personal computer (PC), or a combination thereof. However, these components are illustrative and all of the components are not necessarily essential for the present invention.

Various modifications can be readily conceived by those skilled in the art, such as combining a plurality of machines and allocating functions to them for implementing the respective hardware components of the information processor used in the embodiment of the present invention, and these changes are naturally in the concept included in the thought of the present invention.

The computer system 100 in the embodiment of the present invention can employ an operating system for supporting a GUI multi-window environment, such as a Windows® operating system provided by Microsoft Corporation, an AIX® provided by International Business Machines Corporation, a MacOS provided by Apple Computer Incorporated, Linux®, or the like.

As mentioned above, it will be understood that the computer system 100 in the embodiment of the present invention is not limited to a specific operating system environment. It will be obvious that the computer system 100 may be operated in the operating system environments different from each other.

Figure 3:
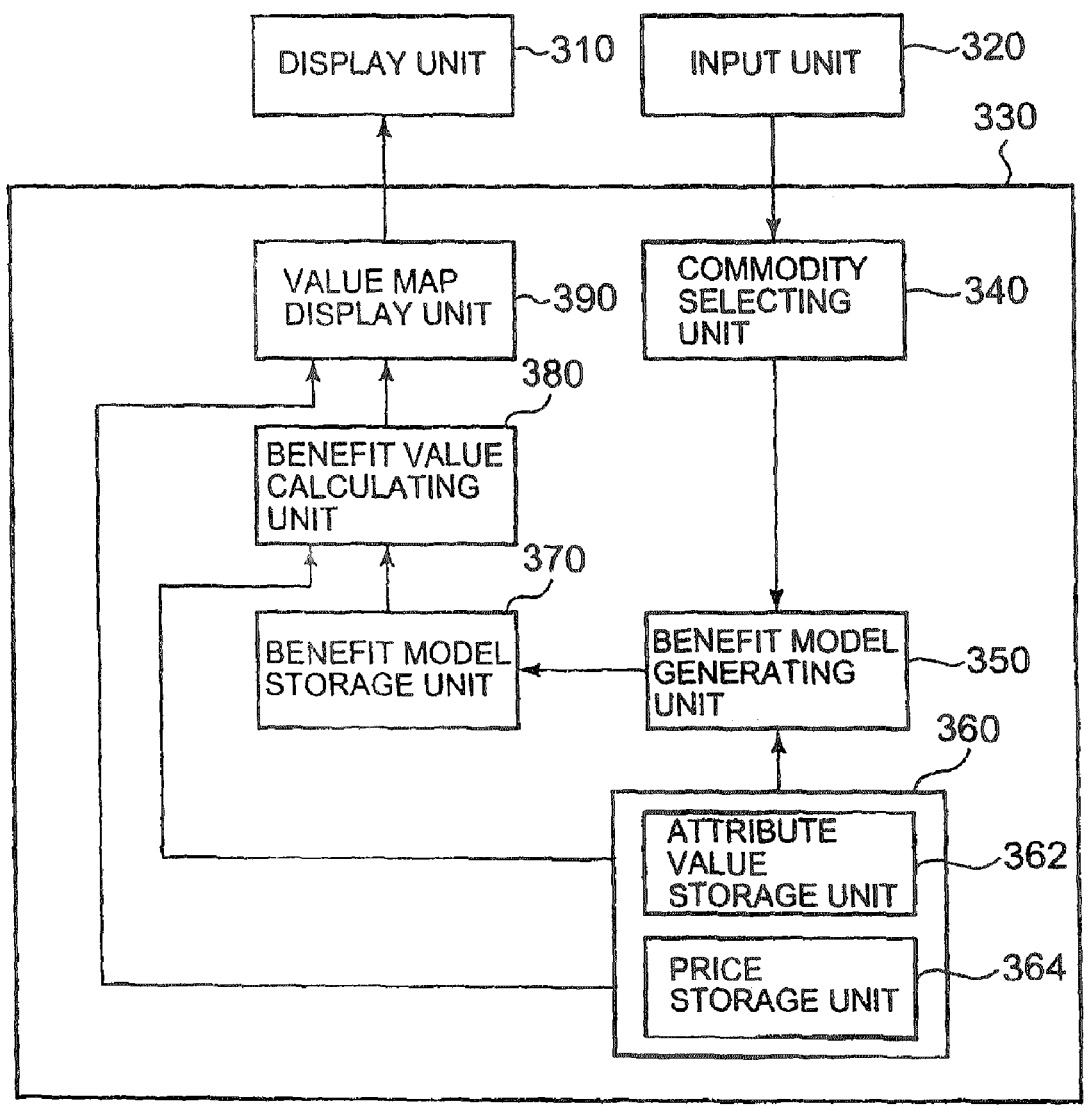
FIG. 3 shows a functional block diagram of the computer system in an embodiment of the present invention.

FIG. 3 shows a functional block diagram of the computer system 100 according to an embodiment of the present invention. Each component shown in the functional block diagram of FIG. 3 can be achieved by first loading the operating system and the computer program stored in the hard disk device 13 or the like to the main memory 4 to then cause the CPU 1 to read them, and making the hardware resource work with the software in the information processing apparatus having the hardware configuration exemplified in FIG. 2.

The computer system 100 preferably includes a display unit 310, an input unit 320, and a data processing unit 330. The input unit 320 is achieved by the keyboard 6, the mouse 7, or the like, and it receives an input (for example, a selection of a specific commodity (product) for creating a benefit model) from a user that operates the system 100. The display unit 310 preferably can display a desktop screen of the multi-window operating system including a window for displaying a value map or the like according to an output signal from the data processing unit 330. The data processing unit 330 is preferably provided with a commodity selecting unit 340, a benefit model generating unit 350, a commodity database 360, a benefit model storage unit 370, a benefit value calculating unit 380, and a value map display controlling unit 390.

The commodity database 360 preferably stores information on a plurality of products or commodities. Specifically, it includes an attribute value storage unit 362 for storing respective attribute values of the plurality of products, and a price storage unit 364 for storing respective selling prices of the plurality of products.

FIG. 5 shows an example of the attribute value storage unit 362 in an embodiment of the present invention. The plurality of products (commodities) in this example are a plurality of menus provided by a plurality of restaurants, and specifically, labeled as menus A through C of W restaurant, menus D through F of X restaurant, menus G through I of Y restaurant, and menus J through L of Z restaurant.

Additionally, the menus A through L which are the plurality of commodities in this example have attributes listed below. The attribute value storage unit 362 in the embodiment of the present invention then stores a value (hereinafter referred to as "attribute value") of each attribute for each of the menus A through L:

(a) the existence of high-class tableware used upon providing the menu (0: non-use, 1: use);

(b) number of food varieties included in the menu;

(c) number of vegetable types included in the menu;

(d) number of topping varieties included in the menu;

(e) amount of bread included in the menu (unit: gram);

(f) amount of food included in the menu (unit: gram);

(g) amount of total energy included in the menu (unit: calorie); and (h) amount of lipid included in the menu (unit: gram).

FIG. 6 shows an example of the price storage unit 364 in this example. The price storage unit 364 stores selling prices of the commodities (menus A through L). The commodity selecting unit 340 in this example can receive a selection of a specific commodity among the plurality of commodities recorded on the commodity database 360, from the user that operates the input unit 320.

The benefit model generating unit 350 in an embodiment of the present invention preferably can generate a benefit model in which a benefit value of the specific commodity selected by the commodity selecting unit 340 becomes the maximum. In this example, the benefit model generating unit 350 generates the benefit model based on the attribute values of the specific commodity recorded on the attribute value storage unit 362 of the commodity database 360. Incidentally, the benefit model in this embodiment of the present invention is a calculation model used for obtaining respective benefit values of the commodities. Details of generation of the benefit model will be described hereinafter. The benefit model storage unit 370 can store data of the benefit model created by the benefit model generating unit 350.

Using the benefit model stored in the benefit model storage unit 370, the benefit value calculating unit 380 preferably can calculate the benefit values of the commodities based on the attribute values stored in the attribute value storage unit 362 of the commodity database 360. The value map display controlling unit 390 in this embodiment of the present invention preferably can display, on the display unit 310, a value map being a visual graph in whish the benefit values of the commodities calculated by the benefit value calculating unit 380, and the selling prices of the commodities stored on the price storage unit 364 of the commodity database 360 are plotted, and present it to the user.

Figure 4:
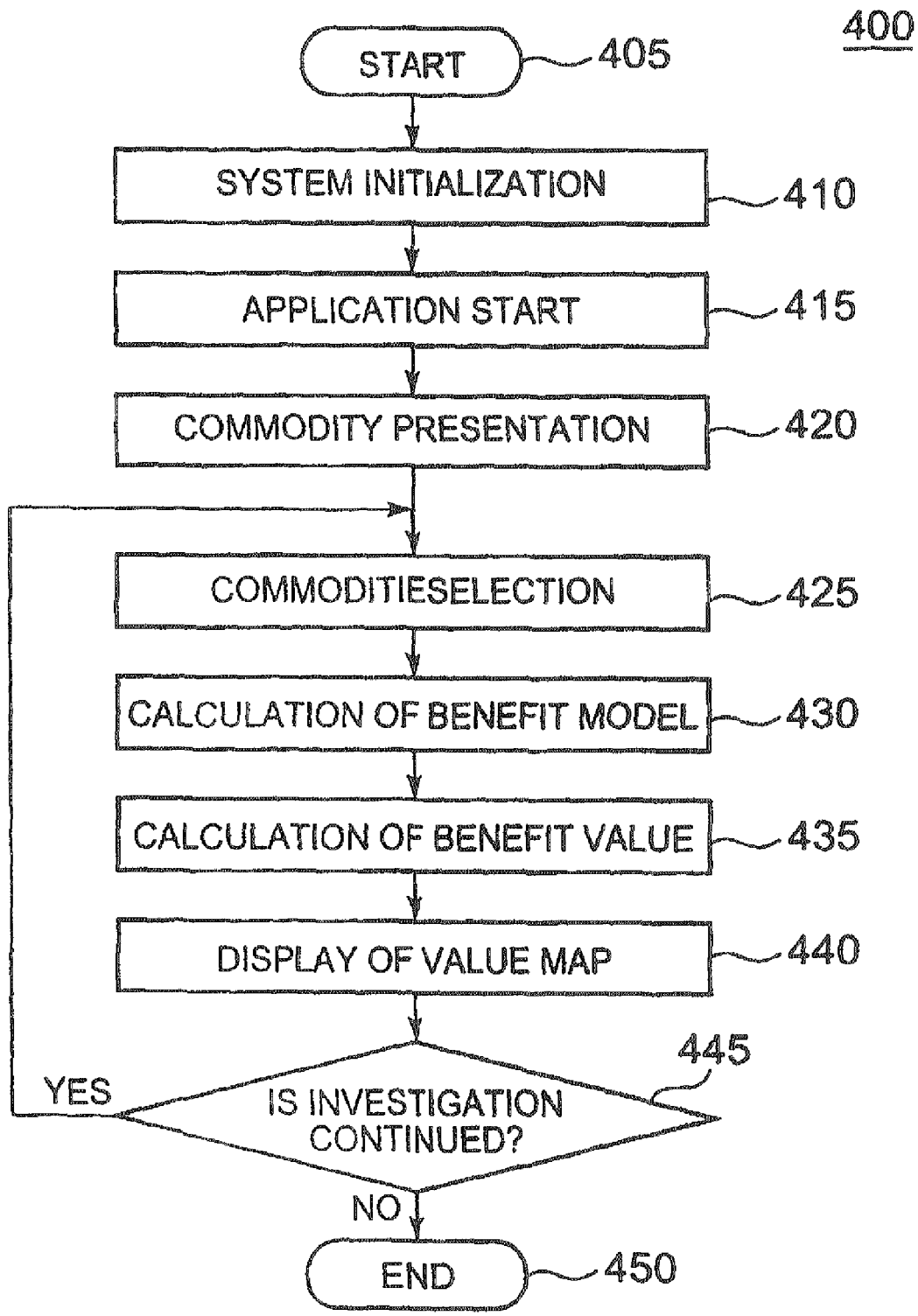
FIG. 4 shows a flow chart representing an operation of the computer system in an embodiment of the present invention.

FIG. 4 shows a flow chart 400 representing an operation of the computer system 100 according to an embodiment of the present invention. The process is started at Step 405. The process then proceeds to Step 410 and the computer system 100 is initialized. The process proceeds to Step 415 and an application for displaying the value map is started in response to an application starting action by the user (for example, double clicking an icon representing an application program on the desktop, or the like).

Figure 10:
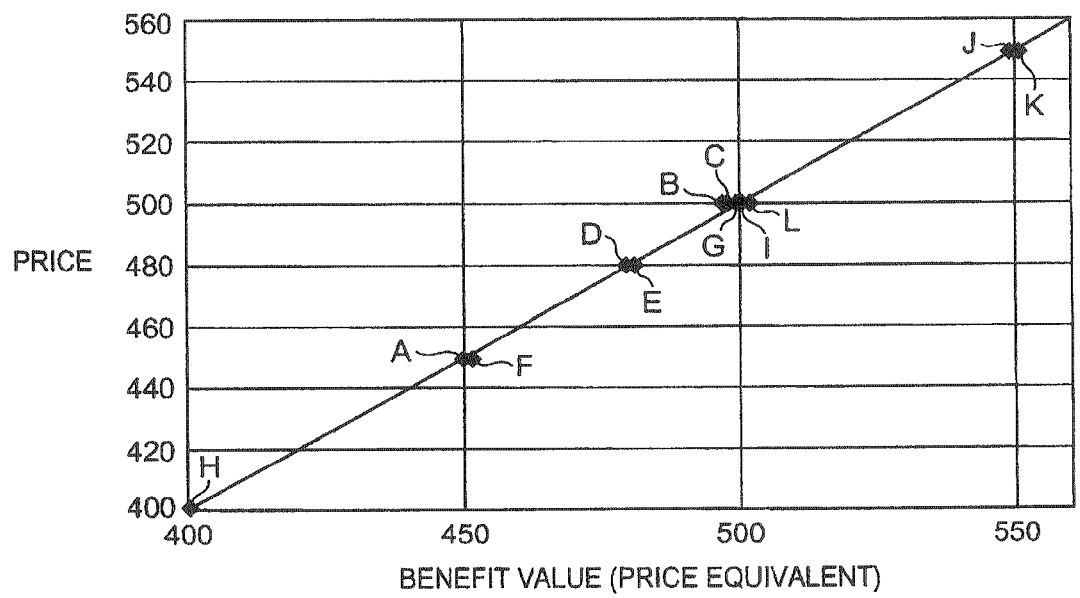
FIG. 10 shows an example of an initial value map created based on the calculation result of the benefit value in an embodiment of the present invention.

The process further proceeds and the value map display controlling unit 390 displays an initial value map on a window corresponding to the application being started at Step 420. FIG. 10 shows the initial value map in this example. Incidentally, it is preferred that the initial value map in the embodiment of the present invention is created considering the selling prices stored in the price storage unit 364 as price equivalents of the benefit values (benefit values converted into price values).

The procedure proceeds to Step 425 and one or more specific commodities (products) are selected among the plurality of commodities by clicking a point corresponding to each commodity plotted on the initial value map. In the embodiment of the present invention, it is preferred that the menu J of the Z restaurant is selected at Step 425. The process proceeds to Step 430 and the benefit model generating unit 350 generates a benefit model in which a benefit value of the specific commodity selected at Step 425 becomes the maximum. Incidentally, the benefit model is preferably generated so that the benefit value of the selected specific commodity may become the maximum, but for example, when all of the attribute values of a certain other commodity are superior to the attribute values of the specific commodity, the benefit value of the specific commodity may become smaller than the benefit value of the other commodity. Namely, it should be noted that the benefit value of the selected specific commodity is not always larger than the benefit value of the other commodity.

The benefit model on the selected specific commodity in which the benefit value becomes the maximum can be obtained by using a linear programming method such as a simplex method, an interior method, or the like. In the embodiment of the present invention, it is preferred that the benefit model is generated, by calculating a plurality of parameters including weighting values $\alpha_k$ for attributes k of a commodity i ($1 \leq k \leq K$), and an intercept $\beta$, applying the simplex method to [Equation 1].

$$\max_{\alpha_1 \ldots, \alpha_K, \beta} \sum_{k=1}^{K} \alpha_k x_{i_0,k} + \beta \qquad \text{[Equation 1]}$$

$$\text{subject to } 0 \leq \sum_{k=1}^{K} \alpha_k x_{i,k} + \beta \leq 1, i = 1, \ldots, I$$

In [Equation 1], i means the commodity selected at Step 425, and $x_{i,k}$ means the attribute value of the attribute k of the commodity i. Additionally, it should be noted that the constraint that the benefit value is not less than 0 and not more than 1 is given to all of the commodities so that the benefit value might not be divergent in [Equation 1].

Moreover, when two or more commodities are selected among the plurality of commodities at Step 425, it is preferred that a plurality of parameters including weighting values $\alpha_k$ and an intercept $\beta$ are calculated, applying the simplex method to [Equation 2] to generate the benefit model. In [Equation 2], J shall mean a selected commodity set.

$$\max_{\alpha_1 \ldots, \alpha_K, \beta} \sum_{i \in J} \left( \sum_{k=1}^{K} \alpha_k x_{i,k} + \beta \right) \qquad \text{[Equation 2]}$$

$$\text{subject to } 0 \leq \sum_{k=1}^{K} \alpha_k x_{i,k} + \beta \leq 1, i = 1, \ldots, I$$

The benefit model generated at Step 430 is stored in the benefit model storage unit 370. The benefit model upon selecting the menu J of the Z restaurant in the embodiment of the present invention as the specific commodity is described in the first row of the table shown in FIG. 7.

The process proceeds to Step 435 and, preferably using the benefit model calculated at Step 430, the benefit value calculating unit 380 calculates benefit values, based on the respective attribute values of the commodities stored in the attribute value storage unit 362.

The benefit value calculating unit 380 also preferably calculates benefit values converted into selling prices of the commodities (hereinafter referred to as "price equivalents of benefit values"). The price equivalent of benefit value $\mu_i$ can be calculated using [Equation 3].

$$u_i = \frac{\sigma_p(v_i - \mu_v)}{\sigma_v} + \mu_p, i = 1, \ldots, I \qquad \text{[Equation 3]}$$

In [Equation 3], $\mu_p$ and $\sigma^2_p$ are the mean and the variance of the prices, respectively, $v_i$ is the benefit value of the commodity i, and $\mu_v$ and $\sigma^2_v$ are the mean and the variance of the benefit values, respectively.

FIG. 8 shows the benefit values and the price equivalents of benefit values calculated using the benefit model upon selecting the menu J of the Z restaurant as the specific commodity in this embodiment of the present invention.

Referring back to FIG. 4, the process proceeds to Step 440 and the value map display controlling unit 390 displays the value map in which the selling prices of the commodities stored in the price storage unit 364 and the benefit values of the commodities calculated at Step 435 are plotted with two axes. In this embodiment of the present invention, the value map display controlling unit 390 preferably displays the value map in which the selling prices and the price equivalents of benefit values are plotted with two axes.

FIG. 10 shows the value map in which the selling prices of the menus stored in the price storage unit 364, and the price equivalents of the benefit values which are calculated using the benefit model (FIG. 7) upon selecting the menu J provided by the Z restaurant as the specific commodity are plotted. The user can perform an analysis from the viewpoint of the customer that prefers the menu J, using this value map to investigate the price setting of the menus.

Referring back to FIG. 4, the process proceeds to Step 445 where it is determined whether or not the user has selected to continue the investigation of the price setting. This selection may be determined, while providing a continue button and an end button in an application window, by whether or not the user has clicked either of the buttons, for example.

At step 445, if the user continues the investigation of the price setting, the process returns from Step 445 to Step 425 through the arrow of YES, and by further clicking a point corresponding to each commodity plotted in the value map, the specific commodity is selected among the plurality of commodities. Subsequently, Steps 430 through 440 will be repeated.

In this example, the menu H of the Y restaurant is selected at returned Step 425. The parameter values of the benefit model upon selecting the menu H provided by the Y restaurant as the specific commodity is shown in the second row of the table shown in FIG. 7. Additionally, FIG. 9 illustrates the benefit values and the price equivalents of the benefit values calculated using the benefit model, upon selecting the menu H provided by the Y restaurant as the specific commodity in the embodiment of the present invention.

Figure 12:
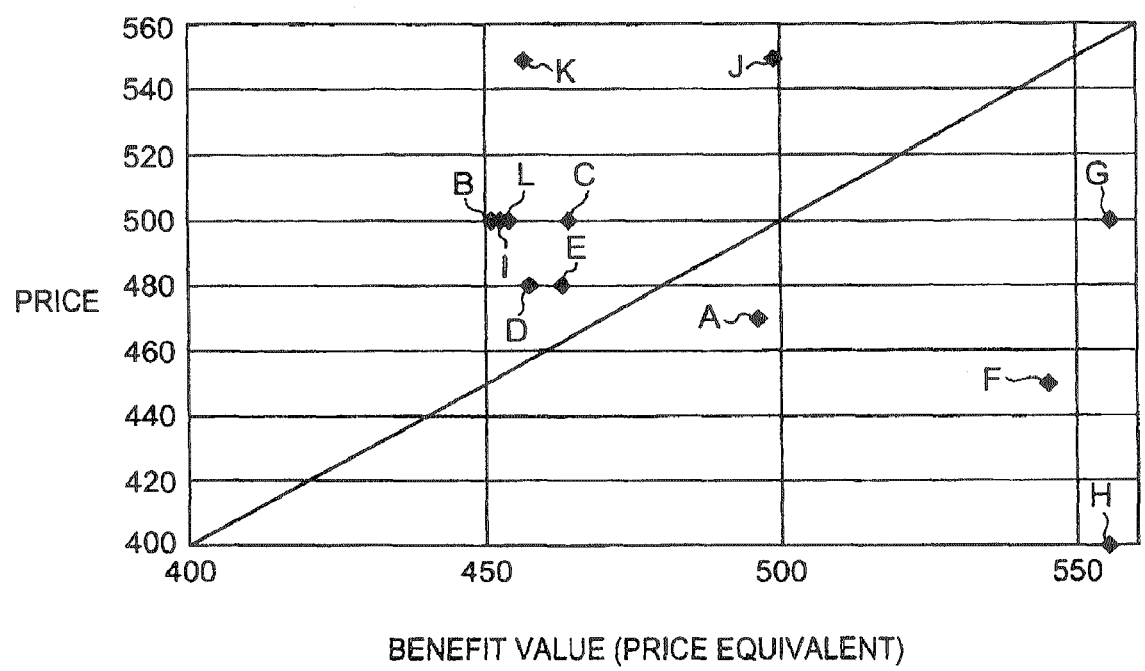
FIG. 12 shows an example of the value map created based on the calculation result of the benefit value in an embodiment of the present invention.

FIG. 12 shows the value map in which the selling prices of the menus stored in the price storage unit 364, and the price equivalents of the benefit values calculated using the benefit model, upon selecting the menu H provided by the Y restaurant as the specific commodity, are plotted. The user can perform an analysis from a viewpoint of a customer that prefers the menu H using this value map to investigate the price setting of the menu.

Figure 11:
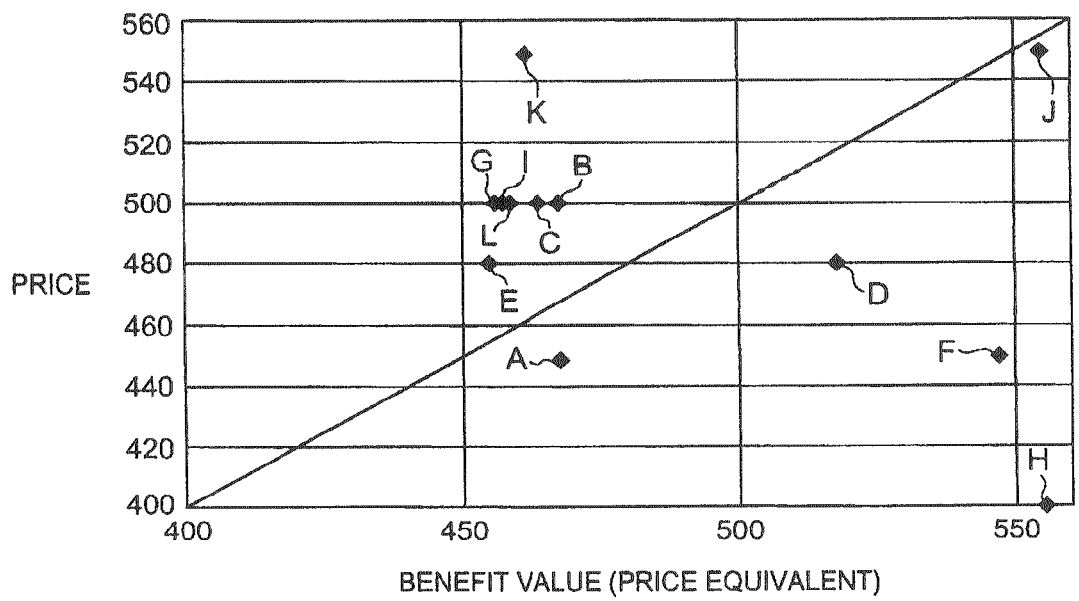
FIG. 11 shows an example of a value map created based on the calculation result of the benefit value in an embodiment of the present invention.

Now, seeing the points J which are objects representing the menu J in the value maps of FIG. 11 and FIG. 12, since the price equivalent of the benefit value of J is calculated using the benefit model in which the benefit value of the menu J becomes the maximum, the point J in FIG. 11 is plotted near the oblique line, called a "value equivalent line", which is a set of points where the prices and the price equivalents of the benefit values are balanced. Since the price equivalent of the benefit values of J is calculated using the benefit model in which the benefit value of the menu H becomes the maximum, the point J in FIG. 12 is plotted at a position considerably shifted to the left-hand side from the price benefit balance line for indicating that the price is higher compared with the benefit. Consequently, according to this embodiment of the present invention, it is understood that information for understanding the benefits of respective commodities from various customers' viewpoints can be presented.

If at Step 445 the user does not continue the investigation of the price setting, the process proceeds from Step 445 to Step 450 through the arrow of NO, and the process according to the flow chart 400 is completed.

As described above, according to an embodiment of the present invention, since it is possible to visually grasp the benefit value of each commodity calculated using the benefit model such that the selected specific commodity is the most advantageous, based on a relation with the actual selling price, the benefit of each commodity seen from the viewpoint of the customer that prefers the specific commodity could be understood. It is possible to readily understand that the user can understand the benefit of the commodity from more various viewpoints to investigate the price setting.

The present invention can also be achieved as hardware, software, or a combination of the hardware and the software. In an execution using the combination of the hardware and software, an illustrative example includes the execution in the data processing system having a predetermined program. In this case, each step of this predetermined program is loaded to the memory of the data processing system to be executed by the CPU, so that this program controls the data processing system and causes it to execute the procedure according to the present invention. This program is constituted of a group of instructions which can be expressed by arbitrary language, code, and notations. Such a group of instructions allows the system to execute a certain function directly or after either or both of (1) conversion to a different language, code, or notation, and (2) duplication to a different medium are executed.

The present invention includes not only such a program itself, but also the medium that records the program in its scope. The program for executing the function of the present invention can be stored in any computer-readable recording media such as a flexible disk, MO, CD-ROM, DVD, hard disk device, ROM, MRAM, RAM or the like. The program can be downloaded from other data processing systems connected via a communication line, or reproduced from other recording media for the storage in the recording medium. The program can also be compressed or divided into plurality of pieces to be stored in a single recording medium or multiple recording media. In addition, it should be noted that the program product for carrying out the present invention could be apparently provided in various forms as well.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for displaying benefit values of a plurality of products in a computer system provided with a CPU, a memory, an input device, and a display unit, the method comprising the steps of:
   receiving a selection of a specific product among the plurality of products from the input device and storing it in the memory;
   generating, by the CPU, a benefit model in which a benefit value of the specific product stored in the memory becomes a maximum value and storing it in the memory;
   calculating, by the CPU, benefit values of the plurality of products, by using the benefit model stored in the memory, and storing the benefit models in the memory; and
   displaying the benefit values of the product stored in the memory on the display unit;

further comprising the step of storing attribute values of the product, wherein the step of generating includes generating the benefit model so that the benefit value of the specific product becomes the maximum, based on the attribute values of the product, and wherein the step of generating includes weighting values for the attributes of the product when generating the benefit model.

2. A method for displaying price equivalents of benefit values of a plurality of products in a computer system comprising a central processing unit (CPU), an input device, and a display unit, said method comprising:
   receiving a selection of a specific product of the plurality of products from the input device;
   after said receiving the selection of the specific product, said CPU generating a benefit model in which a benefit value of the specific product is maximized, said benefit model being expressed as a benefit equation;
   after said generating the benefit model, said CPU calculating a benefit value of each product of the plurality of products, by applying the benefit equation to each product;
   after said calculating the benefit value of each product, said CPU calculating a price equivalent of the benefit value for each product, by using a price equivalent equation that includes parameters relating to the benefit values and selling prices of the products of the plurality of products; and
   after said calculating the price equivalent of the benefit value for each product, said CPU displaying on the display unit a value map in which the selling price of each product and the price equivalent of the benefit value of each product are plotted.

3. The method of claim 2, wherein the price equivalent equation is:

$$\mu_i = \frac{\sigma_p(v_i - \mu_v)}{\sigma_v} + \mu_p$$

for i=1, 2, ..., I,
   wherein I is a total number of products of the plurality of products;
   wherein the products of the plurality of products are denoted as product 1, ..., product I;
   wherein $\mu_i$ is the price equivalent of the benefit value for product i;
   wherein $v_i$ is the benefit value product i;
   wherein $\mu_v$ and $\sigma_v^2$ are a mean benefit value and variance, respectively, of the benefit values of the products of the plurality of products; and
   wherein $\mu_p$ and $\sigma_p^2$ are a mean benefit value and variance, respectively, of the selling price of the products of the plurality of products.

4. The method of claim 2,
   wherein each product comprises a plurality of attributes;
   wherein the benefit equation expresses the benefit value ($v_i$) of each product i as a linear combination of the attributes such that the benefit equation includes an intercept constant ($\beta$) added to a sum of benefit terms ($T_i$), for i=1, ..., I;
   wherein I is a total number of products of the plurality of products;
   wherein each benefit term ($T_i$) is a product of an attribute ($x_i$) of the plurality of attributes and an associated weighting value ($\alpha_i$), for i=1, ..., I; and wherein said generating the benefit model comprises determining the intercept constant (β) and the weighting values ($α_i$) that maximize the benefit value of the specific product, subject to a constraint of the benefit value ($v_i$) of each product i having a value not less than 0 and not exceeding 1, for i=1, ..., I.

5. The method of claim 4, wherein each product pertains to a menu at a restaurant, and wherein the plurality of attributes consist of:
   an existence or non-existence of high-class tableware providing with the menu;
   a number of food varieties included in the menu;
   a number of vegetable types included in the menu;
   a number of topping varieties included in the menu;
   grams of bread included in the menu;
   grams of food included in the menu;
   an number of calories included in the menu; and
   grams of lipid included in the menu.

6. A computer program product, comprising a computer readable storage medium having computer readable program code stored therein, said program code configured to be executed on a central processing unit (CPU) to cause a computer system to perform a method for displaying price equivalents of benefit values of a plurality of products, said computer system comprising the CPU, an input device, and a display unit, said method comprising:
   receiving a selection of a specific product of the plurality of products from the input device;
   after said receiving the selection of the specific product, said CPU generating a benefit model in which a benefit value of the specific product is maximized, said benefit model being expressed as a benefit equation;
   after said generating the benefit model, said CPU calculating a benefit value of each product of the plurality of products, by applying the benefit equation to each product;
   after said calculating the benefit value of each product, said CPU calculating a price equivalent of the benefit value for each product, by using a price equivalent equation that includes parameters relating to the benefit values and selling prices of the products of the plurality of products; and
   after said calculating the price equivalent of the benefit value for each product, said CPU displaying on the display unit a value map in which the selling price of each product and the price equivalent of the benefit value of each product are plotted.

7. The computer product of claim 6, wherein the price equivalent equation is:

$$\mu_i = \frac{\sigma_p(v_i - \mu_v)}{\sigma_v} + \mu_p$$

for i=1, 2, ..., I,
   wherein I is a total number of products of the plurality of products;
   wherein the products of the plurality of products are denoted as product 1, ..., product I;
   wherein $\mu_i$ is the price equivalent of the benefit value for product i;
   wherein $v_i$ is the benefit value product i;
   wherein $\mu_v$ and $\sigma_v^2$ are a mean benefit value and variance, respectively, of the benefit values of the products of the plurality of products; and
   wherein $\mu_p$ and $\sigma_p^2$ are a mean benefit value and variance, respectively, of the selling price of the products of the plurality of products.

8. The computer product of claim 6,
   wherein each product comprises a plurality of attributes;
   wherein the benefit equation expresses the benefit value ($v_i$) of each product i as a linear combination of the attributes such that the benefit equation includes an intercept constant (β) added to a sum of benefit terms ($T_i$), for i=1, ..., I;
   wherein I is a total number of products of the plurality of products;
   wherein each benefit term ($T_i$) is a product of an attribute ($x_i$) of the plurality of attributes and an associated weighting value ($α_i$), for i=1, ..., I; and
   wherein said generating the benefit model comprises determining the intercept constant (β) and the weighting values ($α_i$) that maximize the benefit value of the specific product, subject to a constraint of the benefit value ($v_i$) of each product i having a value not less than 0 and not exceeding 1, for i=1, ..., I.

9. The computer product of claim 8, wherein each product pertains to a menu at a restaurant, and wherein the plurality of attributes consist of:
   an existence or non-existence of high-class tableware providing with the menu;
   a number of food varieties included in the menu;
   a number of vegetable types included in the menu;
   a number of topping varieties included in the menu;
   grams of bread included in the menu;
   grams of food included in the menu;
   an number of calories included in the menu; and
   grams of lipid included in the menu.

10. A computer system comprising a central processing unit (CPU), a computer readable memory unit, an input device, and a display unit, said memory unit containing program code configured to be executed by the CPU to cause the computer system to perform a method for displaying price equivalents of benefit values of a plurality of products, said computer system comprising the CPU, an input device, and a display unit, said method comprising:
   receiving a selection of a specific product of the plurality of products from the input device;
   after said receiving the selection of the specific product, said CPU generating a benefit model in which a benefit value of the specific product is maximized, said benefit model being expressed as a benefit equation;
   after said generating the benefit model, said CPU calculating a benefit value of each product of the plurality of products, by applying the benefit equation to each product;
   after said calculating the benefit value of each product, said CPU calculating a price equivalent of the benefit value for each product, by using a price equivalent equation that includes parameters relating to the benefit values and selling prices of the products of the plurality of products; and
   after said calculating the price equivalent of the benefit value for each product, said CPU displaying on the display unit a value map in which the selling price of each product and the price equivalent of the benefit value of each product are plotted.

11. The computer system of claim 10, wherein the price equivalent equation is:

$$\mu_i = \frac{\sigma_p(v_i - \mu_v)}{\sigma_v} + \mu_p$$

for i=1, 2, ..., I, wherein I is a total number of products of the plurality of products;

wherein the products of the plurality of products are denoted as product 1, ..., product I;

wherein $\mu_i$ is the price equivalent of the benefit value for product i;

wherein $v_i$ is the benefit value product i;

wherein $\mu_v$ and $\sigma_v^2$ are a mean benefit value and variance, respectively, of the benefit values of the products of the plurality of products; and wherein $\mu_p$ and $\sigma_p^2$ are a mean benefit value and variance, respectively, of the selling price of the products of the plurality of products.

12. The method of claim 10, wherein each product comprises a plurality of attributes;

wherein the benefit equation expresses the benefit value ($v_i$) of each product i as a linear combination of the attributes such that the benefit equation includes an intercept constant ($\beta$) added to a sum of benefit terms ($T_i$), for i=1, ..., I;

wherein I is a total number of products of the plurality of products;

wherein each benefit term ($T_i$) is a product of an attribute ($x_i$) of the plurality of attributes and an associated weighting value ($\alpha_i$), for i=1, ..., I; and wherein said generating the benefit model comprises determining the intercept constant ($\beta$) and the weighting values ($\alpha_i$) that maximize the benefit value of the specific product, subject to a constraint of the benefit value ($v_i$) of each product i having a value not less than 0 and not exceeding 1, for i=1, ..., I.

13. The computer system of claim 12, wherein each product pertains to a menu at a restaurant, and wherein the plurality of attributes consist of:

an existence or non-existence of high-class tableware providing with the menu;

a number of food varieties included in the menu;

a number of vegetable types included in the menu;

a number of topping varieties included in the menu;

grams of bread included in the menu;

grams of food included in the menu;

an number of calories included in the menu; and grams of lipid included in the menu.

* * * * *